United States Patent

Cohea

Patent Number: 5,453,579
Date of Patent: Sep. 26, 1995

[54] COMBINATION GROMMET AND WATER TRAP

[75] Inventor: David A. Cohea, Seattle, Wash.

[73] Assignee: Paccar Inc., Bellevue, Wash.

[21] Appl. No.: 722,127

[22] Filed: Jun. 27, 1991

[51] Int. Cl.⁶ ................................................. H01B 17/26
[52] U.S. Cl. ........................ 174/153 G; 174/65 R; 174/65 G; 174/152 G; 174/153 R; 16/2
[58] Field of Search ................ 174/153 G, 65 G, 174/152 G, 65 R, 153 R; 248/56; 16/2, 108; 220/DIG. 6

[56] References Cited

U.S. PATENT DOCUMENTS

| | | | |
|---|---|---|---|
| 1,878,230 | 9/1932 | Morris | 439/242 |
| 1,878,247 | 9/1932 | Beck | 174/152 R X |
| 2,225,472 | 12/1940 | Franklin | 403/197 |
| 2,241,768 | 5/1941 | Deremer | 220/DIG. 6 X |
| 2,517,693 | 8/1950 | Mead et al. | 174/152 G X |
| 2,694,798 | 11/1954 | Cole | 174/153 G X |
| 2,797,955 | 7/1957 | Wilfert | 174/153 G X |
| 2,799,528 | 7/1957 | Wilfert | 174/153 G X |
| 2,897,533 | 8/1959 | Bull et al. | 174/153 G X |
| 3,244,802 | 4/1966 | Sturtevant et al. | 174/153 G |
| 3,518,359 | 6/1970 | Trimble et al. | 174/153 G |
| 4,424,515 | 1/1984 | Arbter et al. | 174/153 G X |
| 4,487,998 | 12/1984 | Pegram | 174/153 G |
| 4,797,513 | 1/1989 | Ono et al. | 174/153 G |

FOREIGN PATENT DOCUMENTS

| | | | |
|---|---|---|---|
| 3403387 | 8/1985 | Germany | 174/153 G |
| 0171164 | 10/1982 | Japan | 174/153 G |

Primary Examiner—Michael W. Phillips
Assistant Examiner—H. S. Sough
Attorney, Agent, or Firm—Seed and Berry

[57] ABSTRACT

A grommet having a groove that corresponds in size to a hole in a wall, and a boot extending from the grommet in the shape of a nipple which forms an outer wall. The grommet also includes an inner wall that extends radially inwardly in the same plane as the wall to which the grommet is mounted, the inner wall defining an aperture through which the wire or bundle of wires passes. The outer wall and inner wall define a chamber for collecting water that enters the inside of the boot. The outer wall further defines a slot through which the collected water drains to remove the water from the inside of the boot.

12 Claims, 1 Drawing Sheet 5,453,579

COMBINATION GROMMET AND WATER TRAP

TECHNICAL FIELD

This invention relates to connection seals, and more specifically, to grommets for supporting and protecting wire or pipe passing through a wall.

BACKGROUND OF THE INVENTION

The need for supporting and protecting electrical wires, cables, and pipes as they pass through a wall has long been recognized. Support for the wire is required to prevent the wire from engaging the opening in the wall, which could damage the wire. In addition, it is often desired to seal water and other debris outside of a passenger compartment of a vehicle or outside an electrical housing into which wires, cables, pipes, and the like must typically pass.

Several attempts have been made to produce a grommet for sealing the area of a wall through which a wire or bundle of wires passes. For example, U.S. Pat. No. 4,797,513 discloses a grommet having a space into which a waterproof rubber material is injected, which hardens to seal the area where a bundle of wires passes through the grommet. Injecting a liquid sealant into the grommet is cumbersome and increases the expense associated with this grommet.

U.S. Pat. No. 2,897,533 discloses a grommet having an internal flange which resiliently engages a wire or tube to create a seal which prevents water and other debris from passing to the inside of a panel. Although this type of seal may be suitable for sealing a single wire that passes through a grommet, it is incapable of preventing water from seeping through passageways formed between multiple wires as they pass through the annular seal.

U.S. Pat. No. 3,518,359 discloses a grommet made of a heat shrinkable material which is heated to shrink around the cable and create a seal. The requirement to apply heat to this type of grommet is cumbersome and creates obvious problems where applying heat is required within the confined areas of electrical housings, engine compartments, and the like.

SUMMARY OF THE INVENTION

Accordingly, it is an object of the invention to provide a simple, economical device for supporting a wire or bundle of wires that passes through a wall and for preventing water and debris from passing to the inside of an electrical housing or passenger compartment of a vehicle into which the wires pass.

Another object of the present invention is to provide a resilient grommet capable of holding one or more wires or cables of varying diameters that pass through a wall.

Another object of the invention is to provide a means for trapping water that enters the inside of a grommet body and draining the water to an area outside of the grommet.

Yet another object of the invention is to provide a means for draining water that enters into the inside of a grommet body through gaps between multiple wires or cables that pass through the grommet body.

Still another object of the invention is to provide a grommet with two stages for preventing water and other debris from passing to the inside of a wall through which a wire or bundle of wires passes, the first stage preventing water from entering inside the grommet body, and the second stage removing any water that enters the inside of the grommet body.

The foregoing objects, along with other objects that will become apparent from the detailed description that follows, are achieved by providing a grommet having a groove that corresponds in size to a hole in a wall, and a boot extending from the grommet in the shape of a nipple which forms an outer wall. The grommet also includes an inner wall that extends radially inwardly in the same plane as the wall to which the grommet is mounted, the inner wall defining an aperture through which the wire or bundle of wires passes. The outer wall and inner wall define a chamber for collecting water that enters the inside of the boot. The outer wall further defines a slot or opening through which the collected water drains to remove the water from the inside of the grommet body.

DETAILED DESCRIPTION OF THE INVENTION

Figure 1:
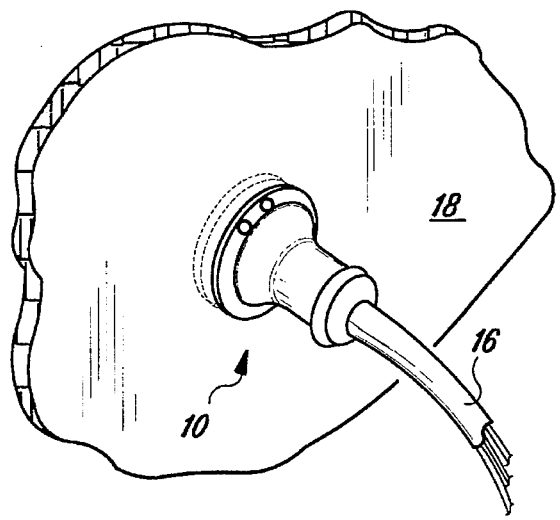
FIG. 1 is a perspective view of a grommet mounted to a wall including the features of the present invention.

As shown in FIG. 1, the present invention relates generally to a grommet 10 for supporting and securing a wire or bundle of wires 16 that passes through a wall 18, such as a fire wall separating an engine compartment and a passenger compartment of a vehicle. It is understood, however, that a grommet having characteristics of the present invention could be utilized in connection with any type of wall or housing through which electrical wires or cables pass.

Figure 2:
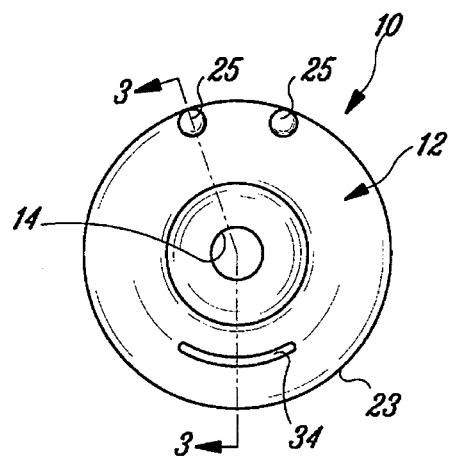
FIG. 2 is a front elevational view of the grommet of the present invention.
Figure 3:
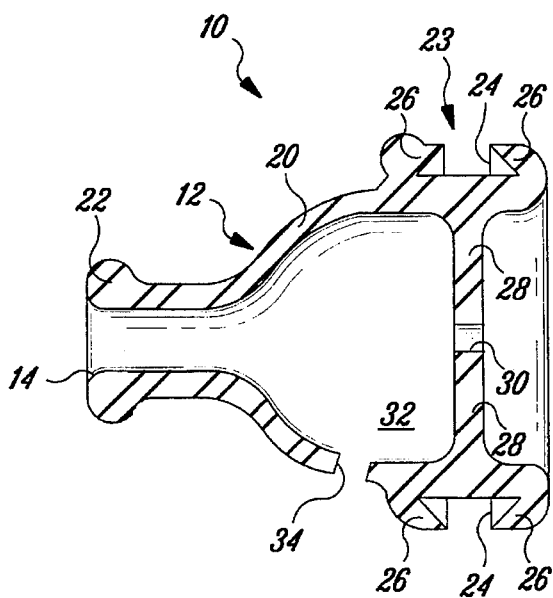
FIG. 3 is a sectional side elevational view, taken along the line 3—3 of FIG. 4, of a grommet according to the present invention.

With reference to FIGS. 2 and 3, the grommet 10 includes a boot 12 generally in the shape of a nipple extending from a location where the grommet is secured to the wall 18. The boot converges at one end to define a narrowed opening 14 through which a wire or bundle of wires 16 passes. This narrowed opening is defined more specifically by a ferruled end 22 of the boot. The boot forms an outer wall 20 which prevents water and debris from reaching inside the boot and keeps water away from the opening in the wall.

At an end of the boot 12 opposite the narrowed opening 14 is a main grommet portion 23 which defines a groove 24 corresponding in size to an opening in the fire wall 18. The groove is more specifically defined by a pair of opposite flanges 26 extending outwardly from the main grommet portion. In one embodiment, as shown in FIG. 3, the groove is generally V-shaped to accommodate any size thickness of wall 18. Although the grommet shown in FIGS. 1–3 is intended to fit in an annular opening, it is understood that the grommet may be altered to fit into a variety of different shapes of openings in the fire wall.

At the top of the main grommet portion 23 is located a pair of protuberances 25. The purpose of the protuberances is to orient properly the grommet, with the protuberances being positioned to correspond to the top of the main grommet portion.

The grommet 10 further defines an inner wall 28 extending radially inwardly from the main grommet portion 23, the inner wall lying in a plane corresponding to the fire wall. The inner wall 28 terminates by defining an aperture 30 through which the wire or bundle of wires 16 passes. The outer wall 20 and the inner wall 28 combine to form a cavity or water trap 32 for collecting water that enters into the inside of the boot 12. Although the outer wall is generally intended to prevent water from entering into the cavity, it is possible that water may enter the cavity around the outside of the wire or bundle of wires, or through gaps in between multiple wires.

The entire grommet 10, including the main grommet portion 23, the outer wall 20, and the inner wall 28, is made of a resilient material that is capable of being deformed to allow a variety of wire diameters or a bundle of wires of various diameters, including any conventional fitting on the end of the wire or bundle of wires, to be inserted through the narrowed opening 14 and the aperture 30.

A slot or opening 34 is located at the bottom of the outer wall 20, which provides a means for draining water that is collected within cavity 32. In one embodiment, preferred dimensions of the slot are ½ inch long in a direction parallel to the fire wall, and ⅛ inch wide. This size of a slot reduces the possibility that surface tension will cause water to remain inside the cavity. Drainage through the slot ensures that no water passes through aperture 30 because the water level inside the boot could not rise all the way up the inner wall 28 to reach the aperture before draining through the slot.

Although the present invention provides a suitable means for preventing water from entering the inside of a fire wall, it may also be desirable to more permanently seal all possible passages through which water may pass to enter into the inside of the fire wall. Accordingly, the slot 34 (or alternatively multiple holes) in the outer wall 20 allows for the injection of a waterproof resilient material that is capable of completely sealing any passageways through which water may pass around or inside of a wire bundle to prevent water from passing through aperture 30. Any conventional sealant could be injected into the cavity 32 to create such a seal.

In operation, a wire or wire bundle is inserted into the grommet body so that it passes through the narrowed opening 14 and through the aperture 30. The grommet is then positioned inside an opening in a fire wall 18 by means of the groove 24. The combination of the boot 12 and narrowed opening 14 provide a first stage which prevents water or other debris from entering into the cavity 32 from the exterior side of the fire wall. In a second stage, if water happens to enter into the cavity 32, the water is collected at the bottom of cavity 32 and drained through the slot or opening 34 to the exterior of the outer wall 20. The collection and drainage of water that enters the cavity takes place on the exterior side of the fire wall 18.

While the preferred embodiments of the present invention have been described and are shown in the drawings, it is to be understood that variations will be apparent to those skilled in the art. Accordingly, the invention is not to be limited to the specific embodiments illustrated in the drawings.

I claim:

1. A grommet for supporting a wire or bundle of wires, comprising:

a grommet body adapted to hold a wire or bundle of wires, the grommet defining a groove corresponding in size to an opening in a structural wall to which the grommet body is coupled;

an outer wall extending from the grommet body and converging to form a narrowed opening that is adapted to receive the wire or bundle of wires;

an inner wall extending inwardly of the grommet body, said inner wall defining an aperture that is adapted to receive the wire or bundle of wires;

the outer wall and inner wall defining a cavity for collecting water that enters the cavity; and the outer wall defining a slot below the aperture in the inner wall at a bottom portion of the outer wall for draining water that collects in the cavity.

2. A grommet according to claim 1 wherein the cavity for collecting the water and the slot for draining the water are located on an exterior side of the structural wall.

3. A grommet according to claim 1 wherein said outer wall terminates in a ferruled end defining the narrowed opening.

4. A grommet according to claim 1 wherein the groove is defined by a pair of opposite flanges, the groove being generally V-shaped for accommodating various thicknesses of structural walls.

5. A grommet according to claim 1 wherein water that collects within the cavity is prevented from passing through the aperture because the aperture is positioned a predetermined height above the slot and the slot is of a size sufficient to cause any water collected in the cavity to drain prior to reaching the height of the aperture.

6. A grommet according to claim 1 wherein a sealant is injected into the cavity through the slot to completely seal the cavity and prevent water from passing through the aperture.

7. A grommet according to claim 1 wherein the grommet body is shaped to be coupled to a circular opening in the structural wall.

8. A grommet according to claim 1 wherein the entire grommet is made of a resilient material that is capable of being deformed to allow a wire or bundle of wires of various diameters to be inserted through the narrowed opening and the aperture.

9. A grommet for supporting a wire or bundle of wires passing through a structural wall having an inside and an outside, comprising:

a grommet body having an outer wall with an opening and an inner wall with an opening, the outer wall and inner wall defining a cavity;

means for holding a wire or bundle of wires within the grommet body with the wire or bundle of wires passing through said openings in said inner wall and said outer wall;

means for securing the grommet body to the structural wall through an opening in the structural wall;

means for collecting water entering into the cavity to prevent the water from passing to the inside of the structural wall; and means positioned below said opening in said inner wall for draining the water collected in the cavity to the outside of said structural wall.

10. A grommet according to claim 9 wherein the collecting means and draining means are located on an exterior side of the structural wall.

11. A grommet according to claim 9 wherein the entire grommet is made of a resilient material capable of being deformed to allow the holding means to secure a wire or bundle of wires of varying diameters.

12. A grommet according to claim 11 wherein the resilient material allows a conventional fitting secured to the end of the wire or bundle of wires to be inserted through the holding means.

* * * * *